Patented Nov. 21, 1950

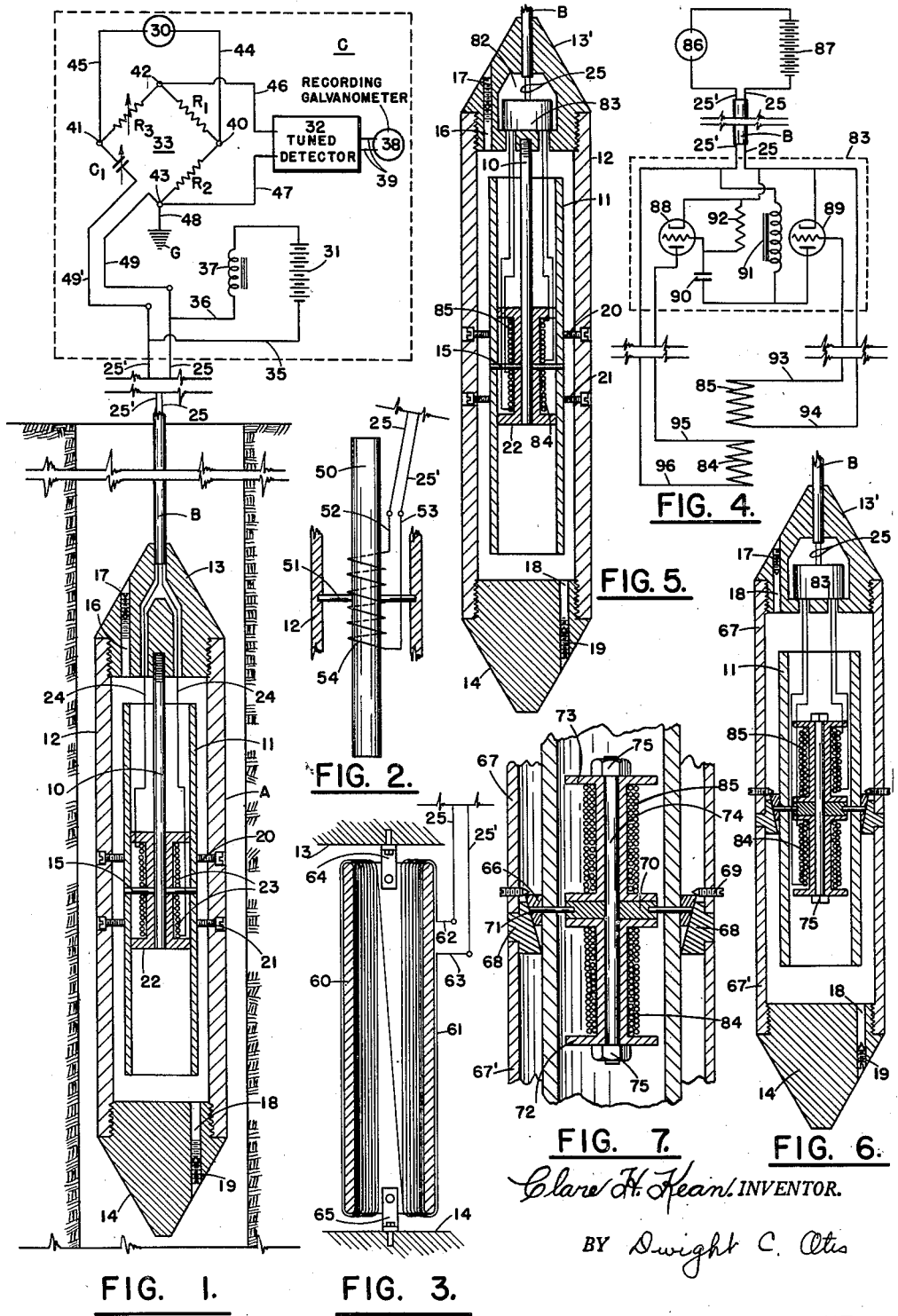

2,530,971

UNITED STATES PATENT OFFICE 2,530,971

ACOUSTIC WELL LOGGING APPARATUS

Clare H. Kean, Houston, Tex., assignor, by mesne assignments, to Standard Oil Development Company, Elizabeth, N. J., a corporation of Delaware Application July 26, 1947, Serial No. 763,940

6 Claims. (Cl. 181—5)

The present invention is directed to an apparatus for the acoustical logging of boreholes in the earth and involves the production of cylindrically symmetric waves or the like within the boreholes being logged.

This application is a continuation-in-part of my co-pending application, Serial No. 597,408, filed June 4, 1945, in which a method of logging boreholes is disclosed and claimed. Various features of the structure shown but not claimed herein are claimed in my co-pending applications Serial No. 776,549, filed September 27, 1947, now Patent No. 2,497,172, and Serial No. 786,753, filed November 18, 1947, now Patent No. 2,490,273.

It is known to log various earth formations penetrated by a borehole by moving through the borehole an acoustic wave generator or transducer which may be excited by electrical means to cause it to vibrate and emit sound waves, and to log variations in character of the earth formations by recording variations in the acoustic impedance thereof as shown by changes in electrical impedance of the sound wave generator. It is also known to log variations in the character of earth formations by generating acoustic waves in a borehole and measuring the seismic velocity, that is, the speed at which elastic waves travel, in the various formations.

To be useful in commercial practice, any logging system must be capable of reproducing the log of each borehole irrespective of the dip or strike of the subsurface formations. I have found that one desirable factor in obtaining reproducible acoustic impedance logs is that the acoustic wave generator must be omni-directional, i. e. must send out and receive acoustic waves substantially uniformly in all radial directions with respect to the axis of the borehole.

Also to be useful in commercial practice, any acoustic impedance logging system must reflect accurately the acoustic impedance of the earth formations surrounding the borehole and must be insensitive to the acoustic impedance of fluid, usually drilling mud or water, in the borehole.

Prior workers in the art have heretofore employed relatively high frequency, vibrating diaphragms in their wave generators. These diaphragms have been not only directional, but also have tended to set up objectionable standing waves which have made difficult, if not impossible, the reproduction of acoustic impedance logs obtained with such systems. Furthermore, the frequencies employed by the prior workers have tended to obscure the true acoustic impedance of the earth formations because at these relatively high frequencies, the well fluid in which the logs were run has had an appreciable effect upon the logs.

I have now invented an improved method and apparatus for acoustic impedance well logging which provides accurate and reproducible acoustic impedance logs in mud or other liquid-filled boreholes. In accordance with my invention, I generate in the liquid-filled borehole acoustic waves of a selected frequency of such value that the wavelength thereof in the borehole liquid is long compared with the diameter of the borehole and is, more importantly, very long compared with the length of the transmission path through the liquid filling the annular space between the acoustic wave generator and the walls of the borehole. By employing these long wavelengths, the effect of the acoustic impedance of the mud upon the wave generator is minimized or practically eliminated. Further, in accordance with my invention, I cause these acoustic waves to be radiated predominantly and simultaneously in all radial directions with respect to the axis of the borehole. By concentrating the acoustic energy predominantly in all radial directions the transmission path is shortened, thereby further minimizing the influence of the borehole liquid. Also by radiating the energy simultaneously in all radial directions, the effects of irregularities in the borehole diameter and the sway and rotation of the wave generator upon its suspending cable are eliminated.

Still further in accordance with my invention, I generate cylindrically symmetric acoustic waves, i. e. waves which may be described as cylindrically expanding waves having constant phase throughout all parts of the wave front, simultaneously over a substantially cylindrical area whose length is greater than the wavelength of the acoustic waves in the borehole liquid and is many times the diameter of the borehole. By generating these cylindrically symmetric waves and radiating them throughout an area whose length is greater than the wavelength of the acoustic waves, formation of unwanted standing waves, as for example by longitudinal reflection of wave energy from top and bottom surfaces of the liquid in the borehole or by reflection from irregularities in the walls of the borehole, is substantially eliminated.

It is an object of the present invention to provide apparatus for logging boreholes an essential element of which is an elongated body adapted to be passed along the borehole, together with means for exciting the body to cause at least a portion thereof to vibrate in a radial direction and send out acoustical waves of greater wavelength than the diameter of the borehole which waves, to a large extent, are reflected back onto the body to damp or reduce the normal amplitude of the vibrations.

Another object of the present invention is to provide apparatus for logging a borehole by producing vibrations in a radial direction over an area of the borehole walls which is longer than a wavelength of the waves in the borehole liquid, the apparatus being so designed that measurements can be made which vary as a function of the character of the formations through which the hole extends.

It is another object of the present invention to provide an apparatus for logging wells, an essential element of which is an elongated body defining a cylindrical outer surface, together with means to excite said body in extensional mode so that it vibrates with a major portion thereof moving in a radial direction to send out acoustical waves which are, to a large extent, reflected back upon it and which tend to damp its vibrations, and with means to measure the energy required to drive the elongated body so as to indicate the extent of this damping action.

Other objects and advantages of the present invention may be seen from a reading of the following description taken with the drawing in which Fig. 1 is an elevation, partly in section, illustrating one embodiment of the present invention.

Fig. 2 is a fragmentary view of another embodiment of the present invention which may be substituted for the elongated tubular member and driving means of Fig. 1;

Fig. 3 is a fragmentary view showing another embodiment which may be substituted for the tubular member and driving means of the device of Fig. 1;

Fig. 4 is in the form of a circular diagram showing the electrical circuit of another embodiment of the present invention;

Fig. 5 is an elevation, partly in section, showing a driving means suitable for use with the circuit of Fig. 4;

Fig. 6 is an elevation, partly in section, of still another embodiment of the present invention employing the circuit of Fig. 4 and an improved means for mounting the elongated tubular member; and Fig. 7 is a sectional view showing in greater detail the mounting means employed in the embodiment of Fig. 6.

Turning now specifically to the drawing and first to the embodiment of Fig. 1, the apparatus may be described as involving a transducer or instrument A arranged for suspension in the borehole on a cable B and adapted for longitudinal movement along the axis of the borehole. The cable contains insulated conductors which connect the instrument A with a power supply and recording means C adapted to be arranged at the surface of the earth. It will be understood that cable B may be thousands of feet in length and may be arranged on a hoist for the convenient lowering and raising of instrument A along the axis of the borehole but such hoisting mechanism is conventional to the art and for the purpose of simplifying the description of the present invention it has not been shown in the drawing.

The instrument A includes a vibrating system capable of producing a cylindrically symmetric wave and is electrically connected with the power supply and recording means C at the surface of the earth so that a value which is a function of the energy required to produce the cylindrically symmetric wave may be displayed by the indicating portion of apparatus C and employed as a log of the borehole. Such a log records data from which inferences may be drawn as to the nature of the various formations along the borehole.

Instrument A is preferably constructed with an outer shell which may be a relatively thin-walled, tubular member 12 with conically shaped closures 13 and 14 at its upper and lower ends, respectively. A small passage 16, closed with cap screws 17, is provided in member 13 and similarly a passage 18, closed with cap screw 19, is provided in end member 14.

The vibrating system within the outer shell includes a tubular body 11. It will be seen that the body 11 is substantially longer than the diameter of the borehole. One purpose in using such an elongated body is to send out a large amount of energy radially and to obtain sufficient reflected energy from the formations to dampen or lower its normal amplitude of vibration when it is caused to send out acoustical waves. Another purpose in using such an elongated body is to direct acoustic wave energy substantially perpendicularly to the axis of the borehole toward an area of the walls thereof whose length is longer than a wavelength of the acoustic waves in the borehole liquid. The body 11 is constructed of a highly magnetostrictive material, such as nickel, cobalt or alloys thereof, and is mounted with its axis coincident with the axis of member 12. The means for vibrating member 11 includes a spool shaped member 22 on which is mounted a coil 23 electromechanically coupled to member 11. The ends of the coil are connected through conductors 24 to the insulated conductors 25 and 25' of cable B.

Elongated magnetostrictive member 11 is mounted within the outer shell so that it is free to vibrate and produce a cylindrically symmetric wave. The mounting includes rod 10 which has its upper end connected to member 13 and its lower end connected by a transversely extending pin 15 to a central portion of member 11 and to spool 23. It will be seen that suitable holes are provided in tubular member 11 and spool shaped member 22 to receive pin member 15. An additional mounting means is provided by a series of adjusting screws 20 and 21 adjacent the medial portion of tubular member 11 and arranged between tubular shell 12 and member 11.

In the mounting of tubular member 11, it would be theoretically desirable to employ only the rod 10 and cross pin so that the remainder would be free to vibrate. However, the weight and space limitations embodied in the construction of a well logging device would not allow such a mounting means to be sufficiently rigid to insure against the contact of the ends of member 11 with tubular shell 12 and for this reason the series of adjusting screws 20 and 21 are provided. It is to be understood that adjusting screws 20 and 21 do not hold the medial portion of tubular member 11 in an absolute fixed position but allow it to vibrate in a radial direction.

Tubular member 11 is driven or excited by alternating current passing through coil 23. Upon excitation, tubular member 11 vibrates in extensional mode, that is, the ends of member 11 move in a longitudinal direction. This longitudinal motion produces a radial motion or vibration such that the medial portion expands and contracts radially. The ratio of the maximum amplitudes of these motions is dependent upon the Poisson ratio of the material of the tube. The magnitude of the longitudinal vibrations of the end portions is greater than the magnitude of the radial vibrations of the cylindrical surface, but since the cylindrical area is very much greater than the area of the ends the major portion of energy withdrawn from the vibrating system is in the form of cylindrically symmetric waves in the radial direction.

It is conventional for boreholes to be drilled by the rotary method and to use drilling mud in producing the hole; accordingly, most holes logged will be filled with drilling mud. The apparatus of the present invention is intended to be used in such mud-filled holes. While useful results may be obtained by moving element 11 and coil 23 through the borehole, tubular shell 12 is preferably provided in order to protect element 11 from direct contact with the walls of the borehole and prevent fouling of the element 11 and the coil 23 with the drilling mud. In order to prevent the entry of mud within the vibrating system and assist in transferring the desired vibrations from element 11 to the walls of shell 12 and thence through the mud to the walls of the borehole, the chamber defined by tubular member 12 and ends 13 and 14 is completely filled with a liquid, such as water. Other suitable liquids having similar density and freedom from changes in viscosity with changes in temperature may be employed. Passages 16 and 18 are provided to allow the convenient filling and draining of liquid from the chamber. It is not necessary to seal the chamber defined by members 12, 13 and 14 in a pressure-tight manner inasmuch as a small amount of liquid leakage into or out of the chamber as the device is being used will not ordinarily interfere with this operation. However, care should be taken to remove completely all gas bubbles likely to be entrapped in the chamber and to prevent entry of gas into the chamber if erratic results are to be avoided. This can be facilitated by flushing the air out with carbon dioxide, which, being soluble in water, will not form free bubbles. The power supply means and indicating means C are adapted to be placed at the surface of the earth and include a means 30 for supplying alternating current, a means 31, such as a battery, for supplying direct current, a tuned detector 32, a recording means 38 and a bridge 33. The means 31 for supplying direct current is connected to conductors 25 and 25' of cable B by conductors 35 and 36, respectively. Conductor 36 has a choke 37 arranged therein.

The bridge 33 includes apices 40, 41, 42 and 43. The means 30 for supplying alternating current is connected to apices 40 and 41 by conductors 44 and 45, respectively. A tuned detector 32 is connected across apices 42 and 43 by conductors 46 and 47, respectively. A recording galvanometer 38 is connected to tuned detector 32 by conductors 39. The arm of the bridge between apices 40 and 42 includes fixed resistor $R_1$, the arm between apices 40 and 43 includes fixed resistor $R_2$ and the arm between apices 41 and 42 includes adjustable resistor $R_3$. Apex 43 is connected to ground G through conductor 48. The arm of the bridge between apices 41 and 43 includes variable condenser $C_1$, conductors 49 and 49' connecting the bridge to the insulated cable B, conductors 25 and 25' of cable B, conductors 24 and coil 23. In other words, the arm of the bridge between apices 41 and 43 includes coil 23 within instrument A which is adapted for movement along the axis of the borehole, electrical connections for connecting this coil with the bridge 33 and a variable condenser $C_1$ adapted to be positioned at the surface of the earth.

In the logging of a borehole, it is desirable to conduct the operation in the following manner. With instrument A, cable B and the power supply and recording means C at the surface of the earth adjacent the borehole, the frequency source 30 is adjusted until the tube 11 in instrument A is at resonance and the bridge 33 is then brought into balance by suitable choice of values for $R_3$ and $C_1$, that is, a null reading of the tuned detector and recording galvanometer 38 is obtained. Bridge 33 is then unbalanced by alternating $R_3$ or $C_1$ separately or simultaneously until galvanometer 38 gives a reading at approximately the mid position of its scale. Instrument A is then lowered along the axis of the borehole by means of cable B and as it passes through the formations penetrated by the borehole the variations in the galvanometer readings indicate the reflection characteristics of the formations. It will be understood that galvanometer 38 may be of the recording type, as illustrated.

The direct current produced by supply 31 acts to polarize that portion of tubular member 11 adjacent coil 23 and when this portion of the member is subjected to the alternating magnetic field produced by the alternating current flowing through coil 23, a vibration is set up in tubular member 11. When tubular member 11 is vibrated in this manner the ends move longitudinally and have an appreciable amount of movement while the medial portion of the cylindrical surface moves radially and has a magnitude of movement of the order of $1/100$ the magnitude of movement of the ends. But because of the relative areas of the surface the major portion of energy removed from the vibrating system is taken from that portion of the system vibrating in a radial direction and these radially directed vibrations pass to the formations adjacent instrument A. When the vibrating system is vibrating the amount of energy removed from and not reflected back into the system is a function of the transmission characteristics, and hence of the reflection characteristics of the formations adjacent instrument A. For maximum efficiency and sensitivity it is desirable to pass through coil 23 an alternating current of very nearly the same frequency as that of the vibrating system. Since the magnetostrictive tube 11 vibrates when alternating current is applied to coil 23, it is apparent that the tube 11 is electromechanically coupled to coil 23. Accordingly, it will be seen that when the tube 11 is damped, as by reflection of energy from the adjacent formations back into the system, the apparent impedance of coil 23 is changed and bridge 33 is unbalanced. The unbalanced condition is transmitted through detector 32 and produces variations displayed in recording galvanometer 38. These variations may be employed to produce a log which is a function of the reflection characteristics of the formation adjacent instrument A.

By way of example, the following dimensions may be employed in the construction of the embodiment shown in Fig. 1: The tubular member 11 may have a length of the order of 9½ feet, an outside diameter of 3 inches and an inside diameter of 2½ inches, and the coil 23 through which the current is passed to drive the system may have a length of approximately 12 inches. A vibrating system of these dimensions may be vibrated in resonance with a current having a frequency of 870. It will be understood that the frequency of the system is a function of the physical dimensions thereof. With the tube described, resonant at a frequency of 870 cycles, it is desirable to maintain the frequency of the exciting current within one-half cycle of the resonance frequency of the tube.

It may be seen that an acoustic wave generator of the above-described dimensions, when caused to vibrate in resonance in the extensional mode, will expand and contract radially and will radiate acoustic waves predominantly radially in all directions over an area whose length is in excess of 9 feet. Since the velocity of acoustic waves averages approximately 5000 feet per second or slightly less, either in water or in a typical drilling mud, it will be apparent that the wavelength of acoustic waves having a selected frequency of 870 cycles per second will be approximately 5.7 feet in either of these media. It will also be apparent to workers in the art that this wavelength is long compared with the usual diameter of boreholes in which formation logs are generally run. Thus, when a generator of the above-described dimensions is lowered into a mud-filled borehole and operated at its resonant frequency, acoustic waves will be radiated predominantly toward the walls of the borehole throughout an area whose length is many times the diameter of the borehole. Since a generator or transducer of the above described dimensions is capable not only of emitting acoustic waves but also of receiving reflected acoustic waves, it will be apparent that the received waves will be reflected thereto predominantly from an area of the borehole walls whose length is greater than the wavelength of the waves. If it is desired to log formations in boreholes having drilled diameters greater than the usual 8 to 12 inches, the above-described dimensions may be increased and the resonant frequency will preferably be reduced.

Fig. 2 shows a view of another vibrating system which may be substituted for the vibrating system of Fig. 1. The vibrating system of Fig. 2 differs from that of Fig. 1 in employing a rod or bar 50 as the elongated member which is driven to vibrate at a resonance frequency. Rod 50 is constructed of a suitable magnetostrictive material, such as nickel, and is mounted by means of a pin 51 passing through a hole drilled transversely through its center. It will be understood that transverse pin 51 may be secured to member 12 by any suitable means to position the vibrating rod 50 within the outer shell defined by members 12, 13 and 14 so that instrument A may be raised and lowered along the bore of a well without exposing the vibrating system to drilling mud and foreign objects in the borehole. The driving means for rod 50 includes a coil 54 arranged around the medial portion thereof and connected through leads 52 and 53 to conductors 25 and 25' of cable B. The means for supplying power and for obtaining a record at the surface may be exactly the same means described and shown in Fig. 1, and accordingly a description of the power supply means and indicating means will not be repeated.

Another embodiment of the vibrating system adapted to be substituted for that of Fig. 1 is shown in Fig. 3. In this embodiment the vibrating system includes a tubular member 60 formed of a magnetostrictive metal. The means for driving tubular member 60 includes a toroidal wound coil 61 with the ends thereof connected through conductors 62 and 63 to insulated conductors 25 and 25' of cable B. Clamping means 64 and 65 are arranged at the ends of the coil and are secured in turn to the end portions 13 and 14 which secures the vibrating system in position with respect to the outer shell composed of members 12, 13 and 14.

In the embodiment of Fig. 3 the supply of power to coil 61 causes at least a major portion of tubular member 60 to move radially. It will be understood that the ends of member 60 may move a slight amount in the longitudinal direction while the remainder moves radially. The power supply means and indicating means employed with the vibrating system of Fig. 3 may be exactly the same as that shown in the embodiment of Fig. 1.

Another embodiment of the present invention is shown in Figs. 4 and 5. In this embodiment a tube of magnetostrictive metal is driven in a manner similar to the embodiments of Figs. 1 and 2. Accordingly, this tube is designated by numeral 11 employed to designate the tube in Fig. 1. In this embodiment, tube 11 is arranged in an outer tubular member 12 provided with a lower end member 14. This embodiment differs from Fig. 1 in being provided with an upper end member 13' which defines a cavity 82 to house a portion of the electrical equipment designated generally by 83. End member 14 corresponds to end member 14 of Fig. 1 and is provided with a passage 18 closed by a cap screw 19 and, in like manner, end member 13' is provided with a passage 16 closed by cap screw 17. The passages in the end members allow the cavity defined by elements 12, 13' and 14 to be filled with liquid in exactly the same manner as the corresponding cavity in the apparatus of Fig. 1. In this embodiment a spool-shaped member 22 is secured to rod member 10 and a cross pin 15 secures a center portion of tube 11 to rod 10. Adjusting screws 20 and 21 are also provided to hold the central portion of vibrating tubular member 11 in position with respect to the shell including members 12, 13 and 14.

The electrical portion of the device includes coils 84 and 85 which are mounted on a spool-shaped member 22 and serve to drive tubular member 11. An indicating instrument, such as a recording galvanometer 86, and a means, such as a battery 87, for supplying direct current is arranged at the surface and connected to insulated conductors 25 and 25' of cable B. Arranged within cavity 82 of upper end member 13' is a container 83 in which are vacuum tubes 88 and 89, coupling condenser 90, choke 91 and resistor 92. It will be seen that one end of coil 85 is connected to the grid of tube 89 by conductor 93 while the other end of coil 85 is connected to conductor 25' of cable B by conductor 94. Similarly, one end of coil 84 is connected to the plate of tube 88 by conductor 95 while the other end of coil 84 is connected to conductor 25' of cable B by conductor 96. This system is self-oscillatory, that is, the rod 11 will oscillate at its natural frequency. As the instrument A is passed along the axis of a borehole, the reflection constant of the formations will be indicated by readings of the recording galvanometer 86. Although in the drawing an oscillator employing two electron tubes having elements connected to coils electromechanically coupled to a magnetostrictive element has been shown, it will be understood that other electron tube oscillators employing one or more vacuum tubes may readily be substituted by a skilled worker in the art.

Still another embodiment of the present invention is shown in Figs. 6 and 7. In this embodiment a tubular element made of magnetostrictive metal is caused to vibrate in a manner similar to the embodiments of Figs. 1 and 5. Hence this tubular element is again designated by the numeral 11 as in Figs. 1 and 5. The embodiment shown in Figs. 6 and 7 is preferably operated in conjunction with an electrical portion similar to that shown in Fig. 4 and, accordingly, the physical structure may be compared with the embodiment shown in Fig. 5. The structure differs from that shown in Fig. 5 principally in the mounting of the coils within the magnetostrictive element 11 and the mounting of the latter within the outside shell 12.

In this embodiment, a ring wedge 66 is securely fastened to a medial portion of tubular element 11. The outer shell is constructed of relatively thin walled non-magnetic tubular elements 67 and 67' which are rigidly affixed, as by welding, to a ring member 68. Ring member 68 is provided with a beveled inner edge adapted to provide a seat for ring wedge 66. Suitable means, such as screws 69, are passed through member 67 at diametrically opposite positions in a manner so that they force ring wedge 66 to seat firmly in ring member 68. In this manner, tubular element 11 may be mounted securely at a single plane which is transversely across the tubular member at a medial portion thereof.

As in Fig. 5, coils 84 and 85 are mounted within tubular element 11. As will be seen from Fig. 7, a non-magnetic metal plate member 70 is rigidly fastened within tubular element 11 by a plurality of diametrically opposite pin members 71 which may conveniently pass through ring member 66. Coils 84 and 85 are wound upon spool-like elements 72 and 73 which are clamped together on opposite sides of plate 70 by means of a non-magnetic metal bolt or threaded rod 74 having nuts 75 screwed on each end thereof. In this way, the entire coil structure, including plate 70 and spool-like elements 72 and 73 having coils 84 and 85 wound thereon, may be positioned within tubular element 11 and spaced away from element 11 at all points except where pin members 71 pass therethrough.

Since the remaining parts of the apparatus shown in Fig. 6 correspond with the parts shown in Fig. 5, a further description of these parts is not necessary.

While I have described several specific embodiments of the present invention, it will be evident to a worker skilled in the art that various changes may be made in the apparatus without departing from the scope of the invention.

Having fully described and illustrated the present invention, what I desire to claim is:

1. An improved apparatus for acoustic impedance logging of formations along the liquid-filled portion of a borehole in the earth comprising, in combination, a transducer of acoustic wave energy of substantially a selected frequency having such a value that the wavelength of said wave energy in the borehole liquid is longer than the diameter of the borehole, said transducer comprising an elongated element constituting a wave generating surface having a greater length than said wavelength and electromagnetic means operatively associated with said element for causing the latter to vibrate in extensional mode at said frequency, a source of electric energy electrically connected to said electromagnetic means for exciting the latter at said frequency, means for moving said transducer along the formations in the borehole, and means for recording variations in electric energy supplied to said electromagnetic means as the transducer is moved along the formations.

2. The improvement in accordance with claim 1 in which said elongated element is a substantially cylindrical, magnetostrictive metal element which is magnetically polarized.

3. The improvement in accordance with claim 2 in which said elongated element is a tube supported solely midway of its length.

4. In apparatus for acoustic impedance logging of formations along the liquid-filled portion of a borehole in the earth, the improvement which includes a transducer of acoustic wave energy of substantially a selected frequency having such a value that the wavelength of said wave energy in the borehole liquid is longer than the diameter of the borehole, said transducer comprising an elongated element constituting a wave generating surface having a greater length than said wavelength and electromagnetic means operatively associated with said element for causing the latter to vibrate in extensional mode at said frequency whereby said element expands and contracts in all directions transverse to its longitudinal axis and generates symmetrically expanding waves substantially throughout its length.

5. The improvement in accordance with claim 4 in which said elongated element is a substantially cylindrical, magnetostrictive metal element which is magnetically polarized.

6. The improvement in accordance with claim 5 in which said elongated element is a tube supported solely midway of its length.

CLARE H. KEAN.

REFERENCES CITED

The following references are of record in the file of this patent:

UNITED STATES PATENTS

| Number | Name | Date |
| --- | --- | --- |
| 1,399,877 | Pupin | Dec. 13, 1912 |
| 2,076,330 | Wood | Apr. 6, 1937 |
| 2,088,324 | John | July 27, 1937 |
| 2,116,522 | Kunze | May 10, 1938 |
| 2,200,476 | Mounce | May 14, 1940 |
| 2,207,281 | Athy | July 9, 1940 |
| 2,244,484 | Beers | June 3, 1941 |
| 2,265,768 | Athy | Dec. 9, 1941 |
| 2,437,282 | Turner | Mar. 9, 1948 |
| 2,451,797 | Blanchard | Oct. 19, 1948 |
| 2,452,085 | Turner | Oct. 26, 1948 |